United States Patent
Piech et al.

(10) Patent No.: US 9,950,902 B2
(45) Date of Patent: Apr. 24, 2018

(54) STATOR STRUCTURE FOR SELF-PROPELLED ELEVATOR

(71) Applicant: OTIS ELEVATOR COMPANY, Farmington, CT (US)

(72) Inventors: Zbigniew Piech, Cheshire, CT (US); Adam Myszkowski, Ostrow Wielkopolski (PL); Cezary Jedryczka, Lniano (PL); Wojciech Szelag, Poznan (PL)

(73) Assignee: OTIS ELEVATOR COMPANY, Farmington, CT (US)

( * ) Notice: Subject to any disclaimer, the term of this patent is extended or adjusted under 35 U.S.C. 154(b) by 208 days.

(21) Appl. No.: 14/889,007

(22) PCT Filed: May 6, 2013

(86) PCT No.: PCT/US2013/039613
§ 371 (c)(1),
(2) Date: Nov. 4, 2015

(87) PCT Pub. No.: WO2014/182271
PCT Pub. Date: Nov. 13, 2014

(65) Prior Publication Data
US 2016/0083225 A1 Mar. 24, 2016

(51) Int. Cl.
*B66B 11/04* (2006.01)
*H02K 41/03* (2006.01)

(52) U.S. Cl.
CPC ........ *B66B 11/0407* (2013.01); *H02K 41/031* (2013.01)

(58) Field of Classification Search
CPC .................................................. B66B 11/0407
See application file for complete search history.

(56) References Cited

U.S. PATENT DOCUMENTS

| 5,183,980 A | 2/1993 | Okuna et al. | |
|---|---|---|---|
| 6,189,657 B1 * | 2/2001 | Jessenberger | B66B 11/0407 187/289 |
| 6,305,501 B1 * | 10/2001 | Kahkipuro | B66B 11/0407 187/250 |

(Continued)

FOREIGN PATENT DOCUMENTS

| CA | 2472743 A1 * | 8/2003 | ............. B60L 13/10 |
|---|---|---|---|
| CN | 102171915 A | 8/2011 | |

(Continued)

OTHER PUBLICATIONS

English Machine Translation of JP 56-71904.*
(Continued)

*Primary Examiner* — William E Dondero
*Assistant Examiner* — Diem M Tran
(74) *Attorney, Agent, or Firm* — Cantor Colburn LLP (57) ABSTRACT

An elevator system includes a hoistway; an elevator car to travel in the hoistway, the elevator car having permanent magnets mounted thereto; a stator mounted in the hoistway, the stator coacting with the permanent magnets to control motion of the elevator car in the hoistway, the stator including: a plurality of modular coil modules, each coil module including stacked coil assemblies, each coil assembly including stacked coil units, each coil unit corresponding to one phase of the stator.

18 Claims, 7 Drawing Sheets

(56) References Cited

U.S. PATENT DOCUMENTS

2005/0062357 A1   3/2005   Aulanko et al.
2011/0221282 A1   9/2011   Markon et al.

FOREIGN PATENT DOCUMENTS

| CN | 102736574 A | | 10/2012 | |
|---|---|---|---|---|
| CN | 103051148 A | | 4/2013 | |
| JP | 56071904 A | * | 6/1981 | ............ H02K 41/02 |
| JP | H06263365 A | | 9/1994 | |
| JP | 2006129546 A | | 5/2006 | |
| WO | 2004060710 A1 | | 7/2004 | |

OTHER PUBLICATIONS

English Machine Translation of JP 2006-129546.*
International Search Report for application PCT/US2013/039613, dated Feb. 21, 2014, 5 pages.
Written Opinion for application for application PCT/US2013/039613, dated Feb. 21, 2013, 5 pages.
European Search Report for application EP 13884223.2, dated Dec. 13, 2016, 10 pgs.
Chinese Office Action and Search Report for application CN 201380078055.8, dated Feb. 4, 2017, 8pgs.

* cited by examiner

STATOR STRUCTURE FOR SELF-PROPELLED ELEVATOR

FIELD OF INVENTION

The subject matter disclosed herein relates generally to the field of elevators, and more particularly, to a stator structure for a self-propelled elevator.

BACKGROUND

Self-propelled elevator systems, also referred to as ropeless elevator systems, are useful in certain applications (e.g., high rise buildings) where the mass of the ropes for a roped system is prohibitive and/or there is a need for multiple elevator cars in a single hoistway.

SUMMARY

According to an exemplary embodiment of the invention, an elevator system includes a hoistway; an elevator car to travel in the hoistway, the elevator car having permanent magnets mounted thereto; a stator mounted in the hoistway, the stator coacting with the permanent magnets to control motion of the elevator car in the hoistway, the stator including: a plurality of modular coil modules, each coil module including stacked coil assemblies, each coil assembly including stacked coil units, each coil unit corresponding to one phase of the stator.

According to another exemplary embodiment of the invention, a propulsion system includes a movable portion comprising a plurality of permanent magnets; and a stationary portion comprising a plurality of phase coil units configured to be stacked along a movement direction, adjoining ones of the phase coil units configured to be connected to power inputs having different phases to provide a motive force to the movable portion.

Other aspects, features, and techniques of embodiments of the invention will become more apparent from the following description taken in conjunction with the drawings.

BRIEF DESCRIPTION OF THE DRAWINGS

Referring now to the drawings wherein like elements are numbered alike in the FIGURES.

DETAILED DESCRIPTION

Figure 1:
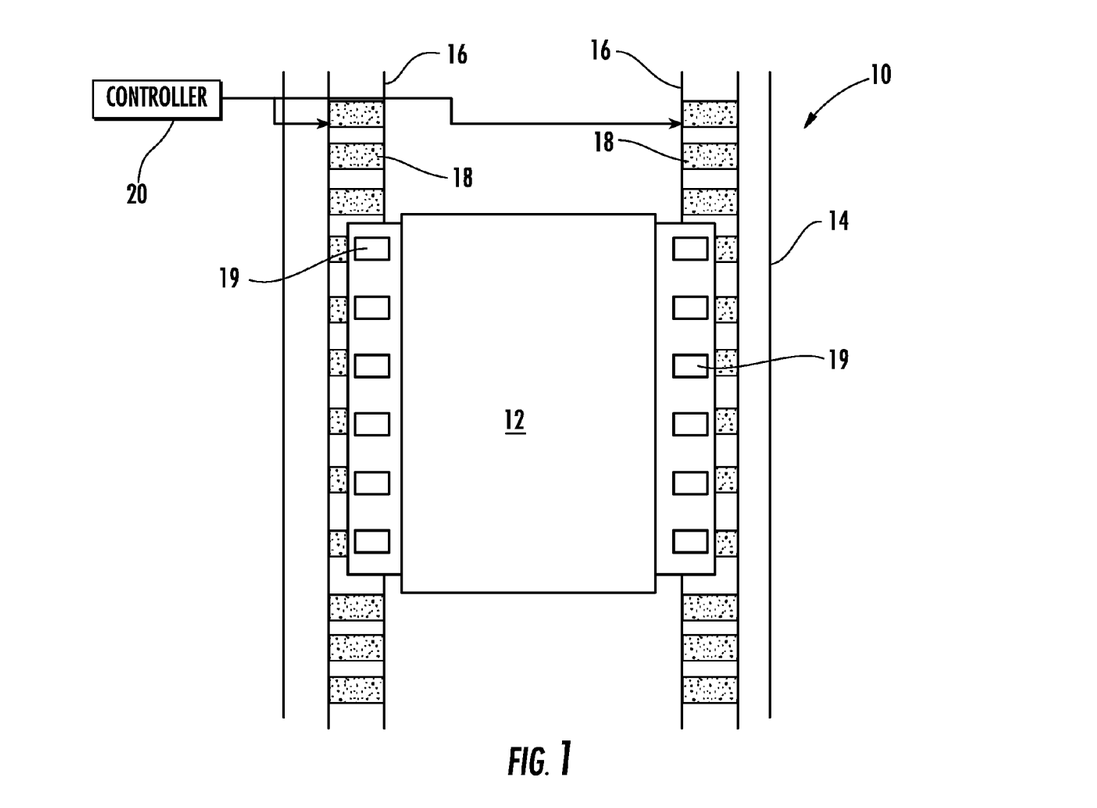
FIG. 1 depicts a self-propelled elevator system in an exemplary embodiment.

FIG. 1 depicts an elevator system 10 having a self-propelled elevator car 12 in an exemplary embodiment. Elevator system 10 includes an elevator car 12 that travels in a hoistway 14. Elevator car 12 is guided by one or more guide rails 16 extending along the length of hoistway 14. Elevator system 10 employs a linear motor having a stator 18 including a plurality of stacked, modular coil modules as described in further detail herein. Stator 18 may be mounted to guide rail 16, incorporated into the guide rail 16, act as the guide rail 16, or located apart from guide rail 16. Stator 18 serves as one portion of a permanent magnet linear motor to impart motion to elevator car 12. Permanent magnets 19 are mounted to car 12 to provide a second portion of the permanent magnet linear motor. Coil units of stator 18 may be arranged in three phases, as is known in the linear motor art. Two or more stators 18 may be positioned in the hoistway 14, to coact with permanent magnets 19 mounted on two sides of elevator car 12.

A controller 20 provides drive signals to the stator(s) 18 to control motion of the elevator car 12. Controller 20 may be implemented using a general-purpose microprocessor executing a computer program stored on a storage medium to perform the operations described herein. Alternatively, controller 20 may be implemented in hardware (e.g., ASIC, FPGA) or in a combination of hardware/software. Controller 20 may also be part of an elevator control system. Controller 20 may include power circuitry (e.g., an inverter or drive) to power the stator(s) 18.

Figure 2:
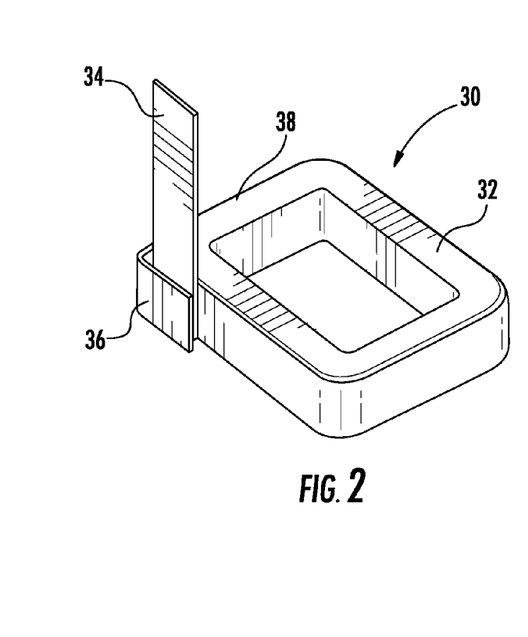
FIGS. 2-4 depict coil units in an exemplary embodiment.
Figure 3:
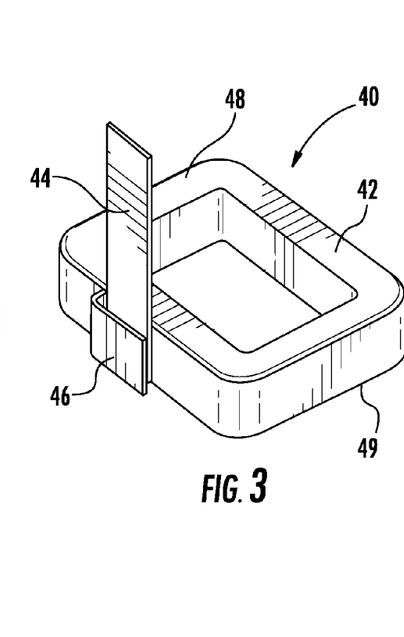
Figure 4:
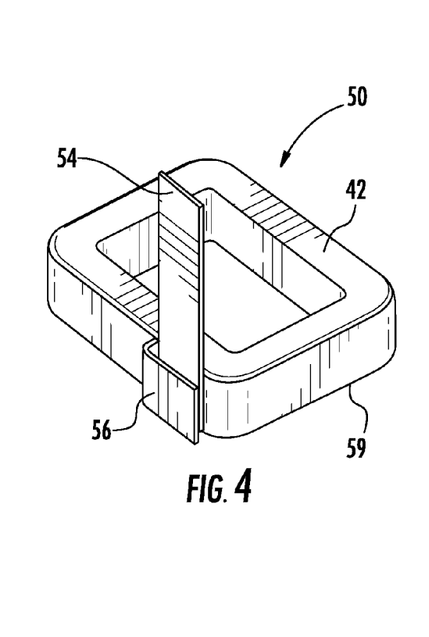

FIGS. 2-4 depict coil units in exemplary embodiments. FIG. 2 depicts a coil unit 30 for a first phase of stator 18. First phase coil unit 30 includes a generally rectangular coil 32 having a central air core. Coil 32 may be formed using wire (e.g., aluminium), conductive tape, etc. First phase coil unit 30 includes a first connector 34 and a second connector 36. First connector 34 is a generally tab shaped element, and extends from coil 32 along a direction of hoistway 14. First connector 34 has a height greater than the height of three coil units. As described herein, first connector 34 electrically connects with a second connector 36 of an upper first phase coil unit positioned above first phase coil unit 30 in a coil module.

Second connector 36 is located where first connector 34 joins coil 32. Second connector 36 may be a u-shaped connector that makes electrical connection with a first connector of a lower first phase coil unit positioned below first phase coil unit 30 in a coil module. First connector 34 and second connector 36 are located adjacent a first edge 38 of coil unit 30.

FIG. 3 depicts a coil unit 40 for a second phase of stator 18. Second phase coil unit 40 is similar to first phase coil unit 30, and includes a coil 42, a first connector 44 and second connector 46. Coil 42, first connector 44 and second connector 46 are similar in construction to a coil 32, first connector 34 and second connector 36. First connector 44 has a height greater than the height of three coil units. First connector 44 and second connector 46 are centrally located on coil 42, between first edge 48 and second edge 49 of coil 42.

FIG. 4 depicts a coil unit 50 for a third phase of stator 18. Third phase coil unit 50 is similar to first phase coil unit 30, and includes a coil 52, a first connector 54 and second connector 56. Coil 52, first connector 54 and second connector 56 are similar in construction to coil 32, first connector 34 and second connector 36. First connector 54 has a height greater than the height of three coil units. First connector 54 and second connector 56 are located adjacent a second edge 59 of coil unit 50. When stacked, second edge 59 of third phase coil unit 50 is opposite first edge 38 of first phase coil unit 30.

Figure 5:
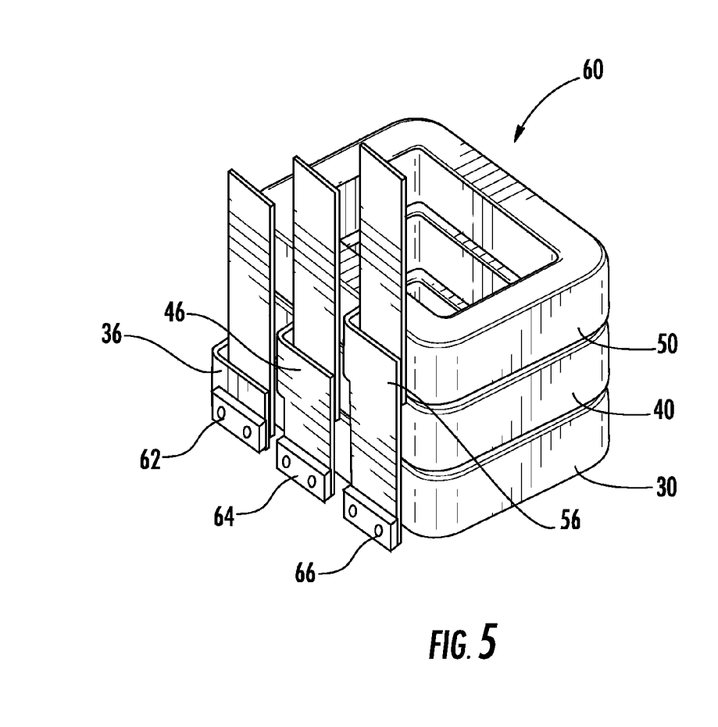
FIGS. 5-6 depict coil assemblies in an exemplary embodiment.
Figure 7:
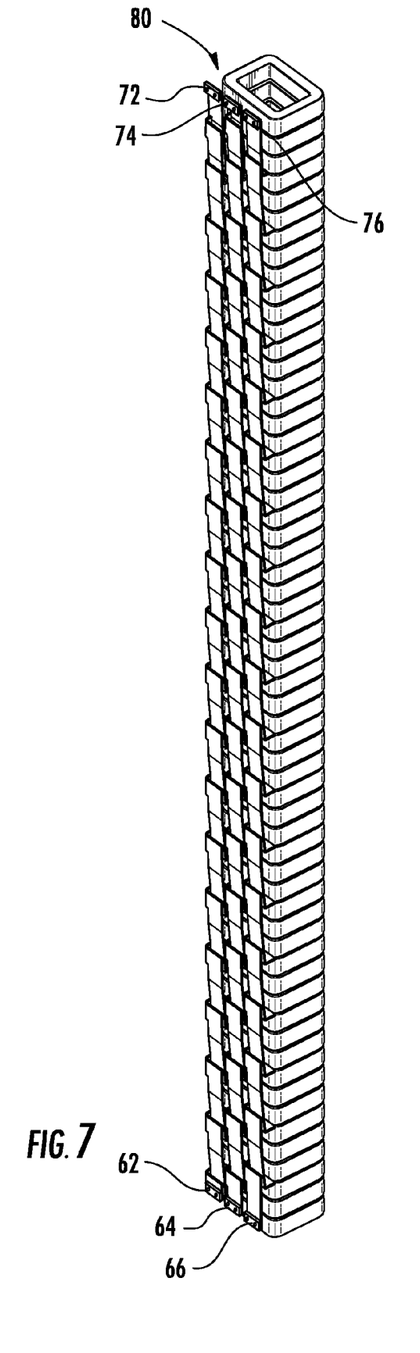
FIG. 7 depicts a coil module in an exemplary embodiment.

FIG. 5 depicts coil units 30, 40 and 50 stacked into a coil assembly 60. Additional coil units may be stacked to form a coil module, as shown in FIG. 7. If the coil assembly 60 is located at the bottom of a coil module, terminals 62, 64 and 66 extend from first phase second connector 36, second phase second connector 46, and third phase second connector 56, respectively. Terminals 62, 64 and 66 are arranged along a single axis and provide a location to electrically connect the phases of a first coil module to a second coil module, or a location to apply drive signals.

Figure 6:
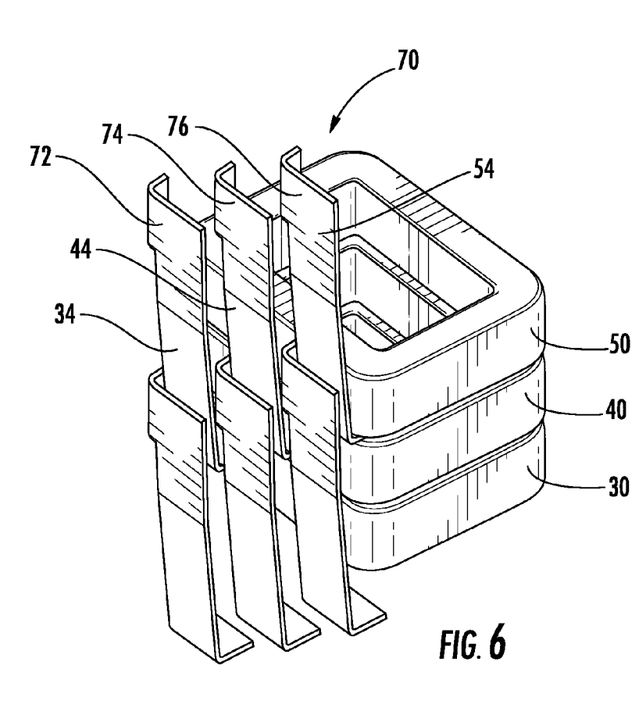

FIG. 6 depicts a coil assembly 70 made up of stacked coil units 30, 40 and 50. Coil assembly 70 is configured for placement at the top of a coil module. As such, terminals 72, 74 and 76 extend from first phase first connector 34, second phase first connector 44, and third phase first connector 54, respectively. Terminals 72, 74 and 76 are arranged along a single axis and provide a location to electrically connect the phases of a first coil module to a second coil module, or a location to apply drive signals.

FIG. 7 depicts a coil module 80 formed from a stack of coil units 30, 40 and 50. Coils units in coil module 80 follow a pattern of first phase coil unit 30, second phase coil unit 40, third phase coil unit 50, first phase coil unit 30, etc. The respective phases (e.g., first, second and third) are electrically connected by the first phase first connector 34, second phase first connector 44, and third phase first connector 54. The bottom coil assembly may be formed as shown in FIG. 5, with terminal 62, 64 and 66 arranged on a single axis. The top coil assembly may be formed as shown in FIG. 6, with terminal 72, 74 and 76 arranged on a single axis.

Figure 8:
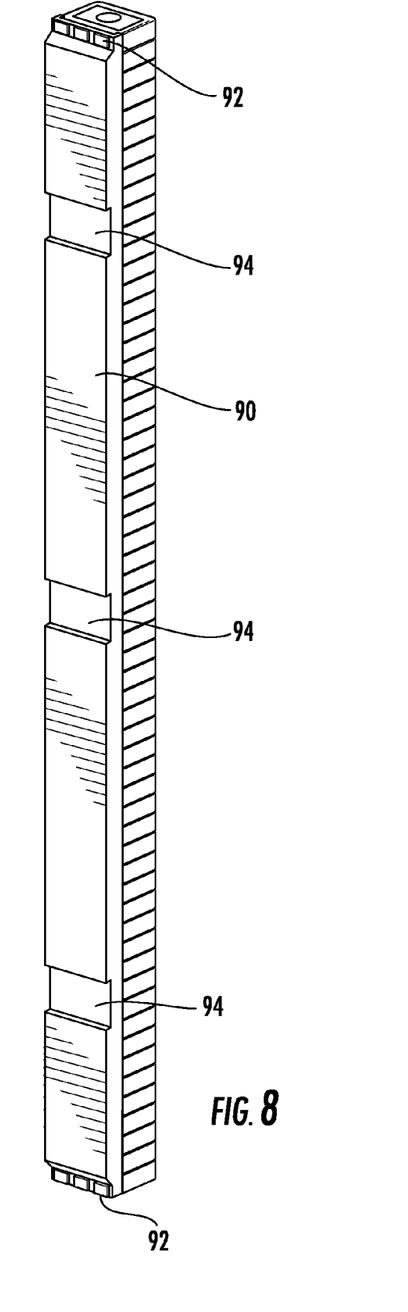
FIG. 8 depicts a coil module and housing in an exemplary embodiment.

FIG. 8 depicts coil module 80 mounted to a housing 90. Housing 90 may be formed from a non-conductive material (e.g., plastic). Housing 90 forms at least one wall of the coil module 80. Coil module 80 may be positioned in housing 90 and the entire assembly impregnated with a curing material, such as concrete with a filler, such as plastic filler, fiber glass or carbon fiber. Once the curing material cures, the coil module 80 and housing 90 are fused and formed a structurally rigid coil module 80. Housing 90 may include one or more openings to provide access to the coil units. Each end of housing 90 may include a recess 92 that provides access to terminals 62, 64 and 66 at one end and terminals 72, 74 and 76 at another end. Openings 94 may be formed in housing 90 at multiple locations to provide access to coil units in the coil module 80. The interior of the coil module 80 may be left open or hollow. This provides for enhanced dissipation and transfer of heat generated in the coil module 80. The channel defined by the interior of the coil module 80 may also serve also as a conduit for cables, pipes, etc., distributed along the hoistway 14.

Figure 9:
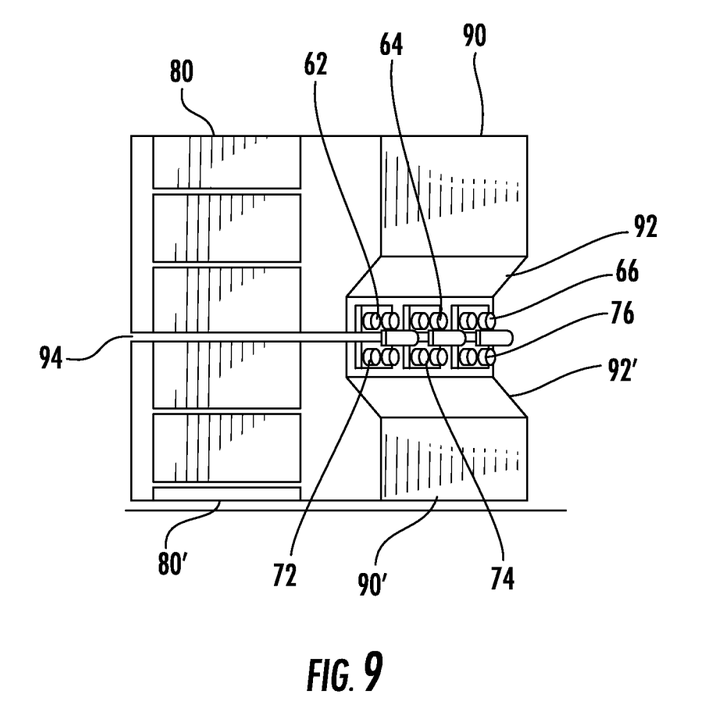
FIG. 9 depicts a junction of two coil modules in an exemplary embodiment.

Coil module 80 may be about 3 m in height, A plurality of coil modules 80 are stacked vertically in hoistway 14 to provide stator 18. FIG. 9 illustrates a junction between two coil modules 80 and 80'. Recesses 92 and 92' in housings 90 and 90' provide an area to access upper terminals 62, 64 and 66 of coil module 80 and lower terminals 72, 74 and 76 of coil module 80'. This allows the coil modules to be electrical connected. A gap 94 may be provided between coil module 80 and coil module 80'. Gap 94 allows the coil modules 80 and 80' to move relative to each other to accommodate building sway, forces on the coil modules, etc. A flexible material (e.g., an elastic member) may be placed in gap 94 between coil module 80 and coil module 80'.

Figure 10:
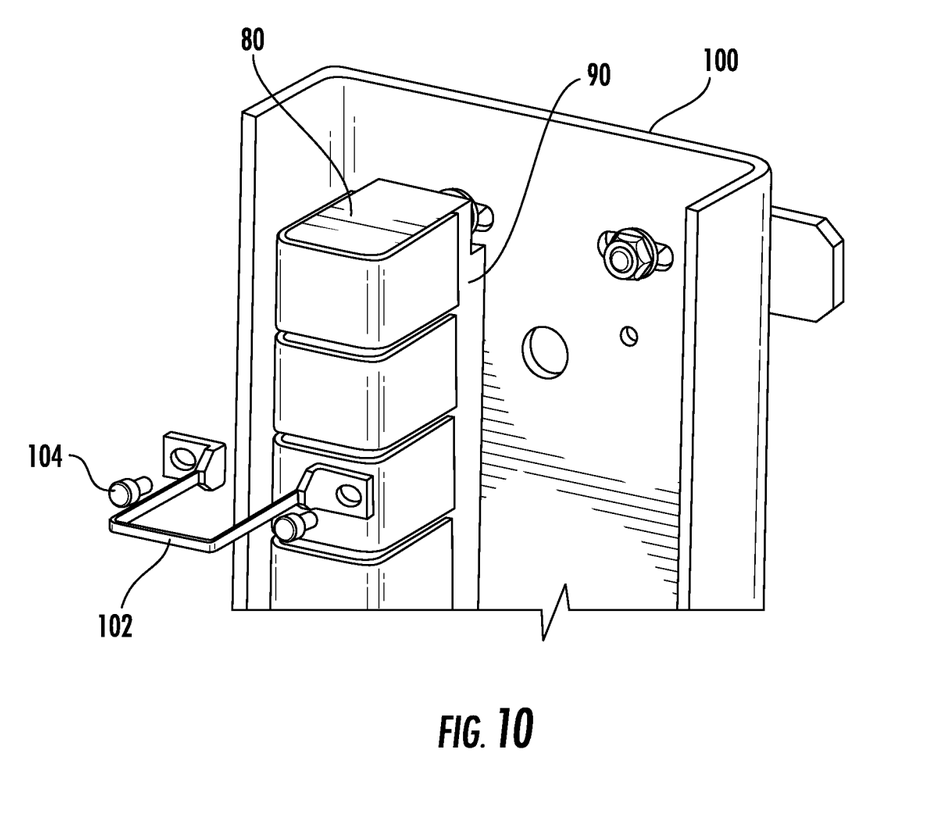
FIG. 10 depicts attachment of a coil module to a support structure in an exemplary embodiment.

FIG. 10 depicts mounting of coil module 80 to a support structure 100. Support structure 100 may be made from metal and c-shaped or L-shaped, for example, to increase rigidity. Support structure 100 may form a portion of guide rail 16 or may be separate from guide rail 16. Support structure 100 may run the entire length of hoistway 14, or may include a plurality of support structures 100, each supporting one or more coil modules 80. A u-shaped bracket 102 extends over coil module 80 and is secured to support structure 100 by fasteners 104 to secure coil module 80 to support structure 100. A plurality of brackets 102 may be used to secure coil module 80 to support structure 100. Loads acting on the coil module 80 are transferred to the support structure 100, which may be mounted to the wall of hoistway 14.

Figure 11:
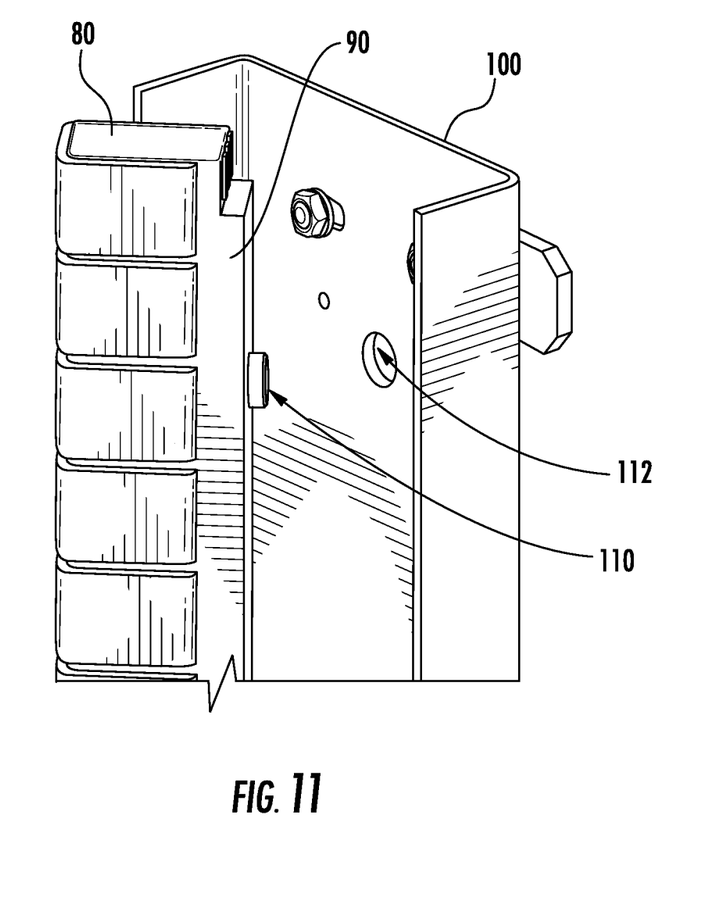
FIG. 11 depicts attachment of a coil module to a support structure in an exemplary embodiment.

FIG. 11 depicts mounting of coil module 80 to support structure 100 in an exemplary embodiment. Housing 90 of coil module 80 includes a protrusion 110. Support structure 100 includes an opening 112 for receiving protrusion 110 to fasten coil module 80 to support structure 100. Protrusion 110 may be press fit into opening 112. Alternatively, an adhesive or fastener may be used to secure the connection between protrusion 110 and opening 112. It is understood that multiple protrusions 110 and openings 112 may be formed on the coil module 80 and support structure 100, respectively. Loads acting on the coil module 80 are transferred to the support structure 100, which may be mounted to the wall of hoistway 14.

Embodiments provide numerous benefits. The coil modules have a simple mechanical structure and a toothless electromagnetic configuration, constructed from inexpensive materials. The coil modules provide for modular fabrication allowing prefabrication and a repeatable process allowing for automation of production. The flexible connection between coil modules enables handling building sways without structural damage. The coil modules also provide enhanced thermal performance, by using materials with low thermal expansion and large surface areas for heat removal, warranting thermal stability.

Embodiments provide a robust design, with rigid mechanical structures and simple mounting methods. Electrical separation between phase coils provides low insulation voltage stress and provides a durable stator system. Modular coil modules result in simple, quick installation. The prefabricated coil modules may be installed in the hoistway on the job site and then electrically connected one to each other. Replacement of a malfunctioning coil module is routine, as each coil module can be disconnected electrically and detached mechanically and replaced with new one.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while the various embodiments of the invention have been described, it is to be understood that aspects of the invention may include only some of the described embodiments. Accordingly, the invention is not to be seen as being limited by the foregoing description, but is only limited by the scope of the appended claims.

The invention claimed is:

1. An elevator system comprising:
a hoistway;
an elevator car to travel in the hoistway, the elevator car having permanent magnets mounted thereto;
a stator mounted in the hoistway, the stator coacting with the permanent magnets to control motion of the elevator car in the hoistway, the stator including:

a plurality of modular coil modules, each coil module including stacked coil assemblies, each coil assembly including stacked coil units, each coil unit corresponding to one phase of the stator;

wherein at least one coil unit includes a tab shaped first connector extending along one side of the coil assembly, the first connector for connecting to an upper coil unit of the same phase in an upper adjacent coil assembly.

2. The elevator system of claim 1 wherein:
at least one coil unit includes a second connector for connecting to a lower coil unit of the same phase in a lower adjacent coil assembly.

3. The elevator system of claim 1 wherein:
the first connector has a height greater than one of the coil assemblies.

4. The elevator system of claim 1 wherein:
the plurality of coil modules include a first coil module stacked above a second coil module, a gap positioned between the first coil module stacked above the second coil module.

5. The elevator system of claim 4 further comprising:
an elastic member positioned in the gap.

6. The elevator system of claim 1 further comprising:
a housing coupled to a first coil module of the plurality of coil modules.

7. The elevator system of claim 6 wherein:
the housing includes at least one opening providing access to terminals of one to the coil assemblies.

8. The elevator system of claim 6 wherein:
the housing includes at least one recess at an end of the housing, the recess providing access to terminals of one to the coil assemblies.

9. The elevator system of claim 1 wherein:
a first coil module of the plurality of coil modules is encased in a cured material.

10. The elevator system of claim 9 wherein:
the cured material includes concrete.

11. The elevator system of claim 9 wherein:
the cured material includes a cavity formed through an interior of the coil module.

12. The elevator system of claim 1 further comprising:
a support structure supporting the plurality of modular coil modules.

13. The elevator system of claim 12 wherein:
the support structure includes a guide rail for the elevator car.

14. The elevator system of claim 1 wherein:
the stator includes three phases, each coil assembly including three coil units, each coil unit corresponding to one of the three phases.

15. A propulsion system comprising:
a movable portion comprising a plurality of permanent magnets; and
a stationary portion comprising a plurality of phase coil units configured to be stacked along a movement direction, adjoining ones of the phase coil units configured to be connected to power inputs having different phases to provide a motive force to the movable portion;
wherein each of the plurality of phase coil units comprises a tab shaped connector extending along one side of the coil assembly, each connector to connect the phase coil unit to at least one other of the phase coil units connected to a power input having a same phase.

16. The propulsion system of claim 15, wherein the phase coil units are connected to power inputs having three phases in a periodically repeating manner.

17. The propulsion system of claim 15, further comprising a plurality of additional stationary portions, wherein the stationary portion and the plurality of additional stationary portions are configured to be connected along the movement direction.

18. The propulsion system of claim 17, wherein each of the plurality of stationary portions is connected to one other of the plurality of stationary portions at a connection junction, and wherein each connection junction comprises a gap to allow relative movement between the stationary portions.

* * * * *